United States Patent [19]
Mori

[11] Patent Number: 4,657,351
[45] Date of Patent: Apr. 14, 1987

[54] HIGH MAGNIFICATION CHANGE RATE ZOOM LENS SYSTEM

[75] Inventor: Susumu Mori, Tokyo, Japan
[73] Assignee: Nippon Kogaku K. K., Tokyo, Japan
[21] Appl. No.: 720,083
[22] Filed: Apr. 4, 1985
[30] Foreign Application Priority Data
Apr. 16, 1984 [JP] Japan .................................. 59-75992
[51] Int. Cl.$^4$ .......................... G02B 9/64; G02B 15/16
[52] U.S. Cl. ................................................. 350/427
[58] Field of Search ................................ 350/423, 427
[56] References Cited
FOREIGN PATENT DOCUMENTS
0078114 5/1983 Japan .

*Primary Examiner*—John K. Corbin
*Assistant Examiner*—Rebecca D. Gass
*Attorney, Agent, or Firm*—Shapiro and Shapiro

[57] ABSTRACT

In a zoom lens system having, in succession from the object side, a first lens group of positive refractive power, a second lens group of negative refractive power, a third lens group of positive refractive power and a fourth lens group of positive refractive power and including a wide angle of view of 70° or more and having a wide magnification change range of a zoom ratio of four times or more, when zooming is effected from the wide angle end to the telephoto end, the first lens group and the fourth lens group are moved linearly on the optic axis toward the object side, and the second lens group is moved nonlinearly on the optic axis in response to the movement of the first and fourth lens groups to maintain the image point constant, and relative to a linear movement locus passing through the position at the wide angle end of the magnification change range and the position at the telephoto end, the second lens group has a movement locus near to the image side from the wide angle end to the vicinity of the intermediate focal length state and has a nonlinear movement locus near to the object side from the vicinity of the intermediate focal length state to the telephoto end.

10 Claims, 12 Drawing Figures

HIGH MAGNIFICATION CHANGE RATE ZOOM LENS SYSTEM

BACKGROUND OF THE INVENTION

1. Field of the Invention

This invention relates to a high magnification change rate zoom lens including a wide angle of view in which the maximum angle of view exceeds 70° and having a wide focus range in which the zoom ratio is four times or more.

2. Description of the Prior Art

Of zoom lenses which include a wide angle in their magnification change range, various zoom lenses in which a first lens group has a positive refractive power and which has a zoom ratio of three times or more are known in recent years, and one of such zoom lenses is taught disclosed, for example, in Japanese Laid-open patent application No. 78114/1983 (U.S. Application Ser. No. 435,710). However, in any of these zoom lenses, the maximum angle of view included in the magnification change range is of the order of 62°, and it has been difficult to realize a high magnification change rate zoom lens system including a greater angle of view and having a zoom ratio of four times or more and a good optical performance over the entire magnification change range. Also, as a zoom lens including a wide angle in its magnification change range, one in which a first lens group has a negative refractive power and the maximum angle of view exceeds 70° is known, but in such zoom lens, the first lens group has a negative refractive power and therefore, a second lens group having a considerably strong positive refractive power must be disposed as the subsequent lens group, and it has been difficult to maintain a good optical performance over the entire magnification change range when an attempt is made to realize a high magnification change rate zoom lens in which the zoom ratio is great.

SUMMARY OF THE INVENTION

It is an object of the present invention to provide a high magnification change rate zoom lens system which includes a wide angle of view exceeding 70° and has a wide magnification change range in which the zoom ratio is four times or more and yet which has a good optical performance over the full range from the wide angle end to the telephoto end and moreover is compact.

To achieve the above object, the zoom lens system according to the present invention comprises, in succession from the object side, a first lens group having a positive refractive power, a second lens group having a negative refractive power, a third lens group having a positive refractive power, and a fourth lens group having a positive refractive power, and when zooming is effected from the wide angle end to the telephoto end, the first lens group, the third lens group and the fourth lens group are moved linearly toward the object side along the optic axis and the second lens group which functions as a compensator to maintain the image point constant is moved nonlinearly along the optic axis in response to the movement of the first lens group, the third lens group and the fourth lens group. The specific movement locus of the second lens group moved nonlinearly, relative to the locus that links the position of the wide angle end with the position of the telephoto end by a straight line, depicts a locus near to the image side from the telephoto end to the vicinity of the intermediate focal length state, and depicts a locus near to the object side from the vicinity of the intermediate focal length state to the telephoto end. By such loci of the lens groups, a high magnification change rate zoom lens system becomes possible which maintains a good optical performance over the wide magnification change range.

DESCRIPTION OF THE PREFERRED EMBODIMENTS

Movement of each lens group will hereinafter be described in detail with reference to the drawings. FIGS. 1A, 1B, 1C and 1D show the loci of movement for magnification change of the lens groups of first to fourth embodiments which will later be described. The actual movement locus of each group is indicated by solid line, and the dotted line indicated at a second lens group G2 is a straight line passing through the position on the wide angle end side fW of the second lens group and the position on the telephoto end fT of the second lens group. Also, the dotted line indicated at a third lens group G3 shows the locus when the third lens group has made nonlinear movement to keep the image point constant in a case where the second lens group moves linearly during the zooming as indicated by dotted line.

Movement of each lens group according to the present invention as shown is advantageous in the following points.

Firstly, it is desired from the viewpoints of the accuracy and working of a cam for zooming that nonlinear movement be avoided as much as possible in the movement of each lens group, and it is very advantageous from these viewpoints that the first, third and fourth lens groups are moved linearly and only the second lens group is moved nonlinearly.

Secondly, the first, third and fourth lens groups having a positive refractive power is relatively weaker in power than the second lens group having a negative refractive power, and if the lens groups having such a weak refractive power are moved nonlinearly, the amount of movement thereof will become great, and this is not preferable from the viewpoints of the accuracy and working of the cam. The fluctuations of aberrations by zooming will also become great. Thirdly, as can be seen from the movement of each group in the respective embodiments shown in FIGS. 1A-1D, when the intermediate focal length between the wide angle end fW and the telephoto end fT is fM and the intermediate focal length between fW and fM is fWM and the intermediate focus between fM and fT is fMT, the spacing DI between the first lens group G1 and the second lens group G2 widens more at fWM in the case of the present invention indicated by solid line than when the third lens group G3 is moved nonlinearly as indicated by dotted line, and the second lens group G2 is positioned relatively on the image plane side. This has the effect of suppressing the tendency of the astigmatism at fWM fluctuating more greatly in the plus direction than the astigmatism at fM and keeping the image plane flat. Also, at fMT, the spacing DI between the first lens group G1 and the second lens group G2 becomes small and the second lens group G2 is positioned relatively on the object side, and this has the effect of suppressing the tendency of the astigmatism at fMT fluctuating more greatly in the minus direction than the astigmatism at fT and also keeping the image plane flat.

In the basic construction of the present invention as described above, when the focal lengths of the first lens group G1, the second lens group G2, the third lens group G3 and the fourth lens group G4 are $f_1$, $f_2$, $f_3$ and $f_4$, respectively, and the focal length of the entire system at the wide angle end is fW and the focal length of the entire system at the telephoto end is fT, it is desirable that the following conditions be satisfied:

$$1.0 \leq f_1/fM \leq 1.4 \quad (1)$$

$$0.4 \leq |f_2|/fW \leq 0.7 \quad (2)$$

$$0.5 \leq f_3/fM \leq 1.0 \quad (3)$$

$$0.3 \leq f_3/f_4 \leq 1.0 \quad (4)$$

where fM is defined as $fM = \sqrt{fW \cdot fT}$.

Also, when the deviation width of the nonlinear movement locus of the second lens group G2 for magnification change from the linear movement locus thereof, i.e., the deviation width from the straight line passing through the position of the wide angle end the position of the telephoto end, is e as shown in FIG. 1, it is desirable that the following condition be satisfied:

$$0.03 \leq e/|f_2| \leq 0.25 \quad (5)$$

If the lower limit of condition (1) is exceeded, the refractive power of the first lens group will become too strong and therefore, in the wide view angle range in which the maximum angle of view exceeds 70°, the angle of incidence onto the first lens group will become great and astigmatism and distortion will occur greatly. Also, on the telephoto side, spherical aberration and coma will become liable to occur due to the strong refractive power of the first lens group.

Also, if the upper limit of condition (1) is exceeded and the refractive power of the first lens group becomes weak, the magnification changing effect obtained by the first lens group being moved toward the object side during the zooming from the wide angle side to the telephoto side will become small and thus, to obtain the necessary magnification change, the amount of movement must be made great. Also, if the first lens group is endowed with the focusing function, to obtain the necessary closest photographing distance, the amount of movement of the first lens group toward the object side must be made great and thus, not only the full length of the lens will become great, but also the diameter of the forward lens component must be made great to maintain sufficient aperture efficiency and after all, a great filter diameter will be required and it will become difficult to make the lens compact.

If the lower limit of condition (2) is exceeded, the refractive power of the second lens group will become strong and therefore the curvature of the lens constituting the second lens group will become sharp and the light rays having emerged from the first lens group will be sharply refracted to cause astigmatism, distortion and lateral chromatic aberration to be aggravated on the wide angle end side and spherical aberration and coma to be aggravated on the telephoto end side. Also, there are a stop and the third lens group on the image side of the second lens group, and the spacing between the second lens group and the third lens group will become small on the wide angle end side and the amount of movement of the third lens group for obtaining a high magnification change rate cannot be secured sufficiently. The second lens group also is a mechanism moved during the zooming and therefore, if the lower limit of condition (2) is exceeded and the power of the second lens group becomes strong, the accuracy of the mechanism thereof will become considerably severe. Also, if the upper limit of condition (2) is exceeded, the refractive power of the second lens group will become weak and therefore, on the wide angle end side, the light ray of a maximum angle of view passing through the first lens group will pass through a location spaced apart from the optic axis, thus causing the diameter of the forward lens of the first lens group to be great.

Also, since the spacing between the second lens group and the third lens group at the wide angle end must be made great, the full length will become greater than necessary and compactness of the entire system cannot be achieved. Further, the second lens group acts as a compensator for maintaining the image point constant and therefore, when the refractive power thereof becomes weak, the amount of nonlinear movement becomes greater than necessary and the fluctuations of aberrations by zooming become liable to occur.

If the lower limit of condition (3) is exceeded and the refractive power of the third lens group becomes strong, the light ray will be subjected to the divergence of the relatively strong refractive power of the second lens group on the wide angle end side and thereafter subjected to the strong refraction of the third lens group and thus, spherical aberration and coma will be liable to occur greatly on the wide angle end side and spherical aberration will be increased also on the telephoto end side, and this is not preferable. At the same time, the spacing at the wide angle end between the second lens group and the third lens group will become small and the amount of movement of the third lens group for obtaining a high magnification change rate cannot be secured sufficiently. Also, at this time, the distance from the last surface of the lens system to the image plane, i.e., the back focal length, cannot be secured sufficiently and this is not suitable for a single lens reflex camera or the like. Conversely, if the upper limit of condition (3) is exceeded and the power of the third lens group becomes weak, the spacing at the wide angle end between the second lens group and the third lens group will become great and thus, the principal ray passing through the center of the stop on the wide angle end side will pass through the first lens group and the second lens group at a location considerably spaced apart from the optic axis and therefore, not only the filter diameter will become giant but also the back focal length and the full length of the lens system will become greater than necessary, and it will become difficult to make the lens system compact.

Condition (4) limits the power of the fourth lens group under condition (3). If the lower limit of condition (4) is exceeded, the refractive power of the fourth lens group will become weak and even if the oblique light ray passes through the third lens group, it will enter the fourth lens group still at a great angle because the stop lies on the object side of the third lens group and therefore, the fourth lens group itself will unavoidably be of a great diameter. Also, the back focal length will become greater than necessary, and this is not preferable in making the lens system compact. Conversely, if the upper limit of condition (4) is exceeded and the refractive power of the fourth lens group becomes strong, not only it will become difficult to obtain the necessary back focal length, but also a strong refractive power will act on the oblique light ray, thus causing curvature of image field and lateral chromatic aberration to occur greatly.

Now, description will be made of the amount of displacement of the nonlinear movement of the second lens group G2 necessary for magnification change relative to the linear movement which has been shown in condition (5).

This condition is for imparting an optimum nonlinear movement to the second lens group G2 to maintain a good imaging performance over a wide magnification change range. If the lower limit of this condition is exceeded and the amount of nonlinear movement of the second lens group G2 becomes small, the second lens group G2 will effect a movement considerably approximate to linear movement and it will become difficult to maintain a good optical performance over the wide magnification change range. Particularly, in the aforementioned intermediate focal length state fWM between the wide angle end fW and the intermediate focal length fM, astigmatism will fluctuate more greatly in the position direction than in the aforementioned intermediate focal length state fM, and the astigmatism in the intermediate focal length state fMT between the aforementioned intermediate focal length fM and the telephoto end fT will fluctuate more greatly in the negative direction than at the telephoto end fT and thus, the fluctuation of astigmatism resulting from magnification change will become great. If the upper limit of this condition is exceeded and the amount of nonlinear movement of the second lens group G2 becomes great, the amount of movement itself of the second lens group G2 will become further great and as shown in FIG. 1, the turning-back of the locus of the second lens group G2 will become steep, and this is not preferable from the viewpoints of the accuracy and mechanism of the cam. In the aforementioned intermediate focal length state fWM between the wide angle end fW and the intermediate focal length fM, astigmatism will fluctuate more greatly in the negative direction than in the intermediate focal length state fM, and the tendency of the astigmatism in the intermediate focal length state fMT between the intermediate focal length fM and the telephoto end fT fluctuating more greatly in the positive direction than at the telephoto end fT will become remarkable, and this is neither preferable.

In such construction of the present invention, to provide a zoom lens including a wide angle of view in which the maximum angle of view exceeds 70° and having a wide magnification change range in which the zoom ratio is four times or more, it is desirable that in addition to the aforementioned conditions (1)-(5), the following condition be satisfied. That is, with regard to the ratio between the amounts of movement of the fourth lens group and the third lens group during the zooming, $$0.25 \leq V3/V4 \leq 0.85 \qquad (6)$$

where V3 represents the amount of movement of the third lens group and V4 represents the amount of movement of the fourth lens group. According to this, it becomes possible to maintain a more stable performance throughout the wide magnification change range.

Some embodiments of the high magnification change rate zoom lens according to the present invention will hereinafter be described. Any of the first to fourth embodiments of the present invention has a focal length of 28 mm–135 mm, a zoom ratio of 4.8 and F-number of the order of 4.0–4.5 as a zoom lens for 35 mm camera, and the lens constructions thereof are as shown successively in FIGS. 2 to 5.

As shown, the first lens group G1 has, in succession from the object side, a negative meniscus lens L1 having its convex surface facing the object side, a biconvex positive lens L2 and a positive meniscus lens L3 having its convex surface facing the object side. The negative meniscus lens L1 and the biconvex positive lens L2 may be joined to each other. The second lens group G2 has, in succession from the object side, a negative meniscus lens L4 having its convex surface facing the object side, a biconcave negative lens L5, a biconvex positive lens L6 and a negative lens L7 having its surface of sharper curvature facing the object side, the biconvex positive lens L6 and the negative lens L7 being joined to each other. The third lens group G3 has at least one positive lens L8, L8' and a negative meniscus lens L9 having its convex surface facing the image side. The fourth lens group G4 has, in succession from the object side, at least one positive lens L10, L10', L10'', a biconcave negative lens L11, a positive meniscus lens L12 having its convex surface facing the image side, a positive lens L13 and a negative meniscus lens L14 having its concave surface facing the object side, the positive lens L13 and the negative meniscus lens L14 being joined to each other.

Figure 1A:
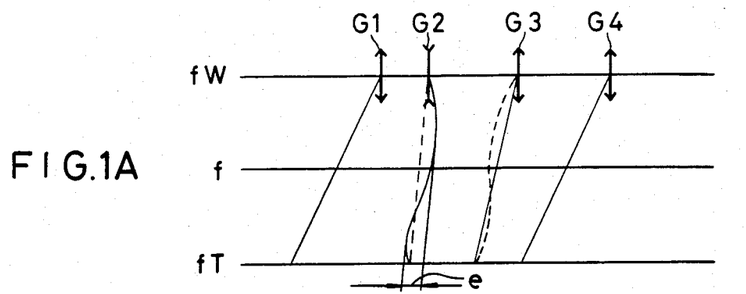
FIGS. 1A-1D show the movement loci of lens groups for magnification change in first to fourth embodiments of the present invention.
Figure 2:
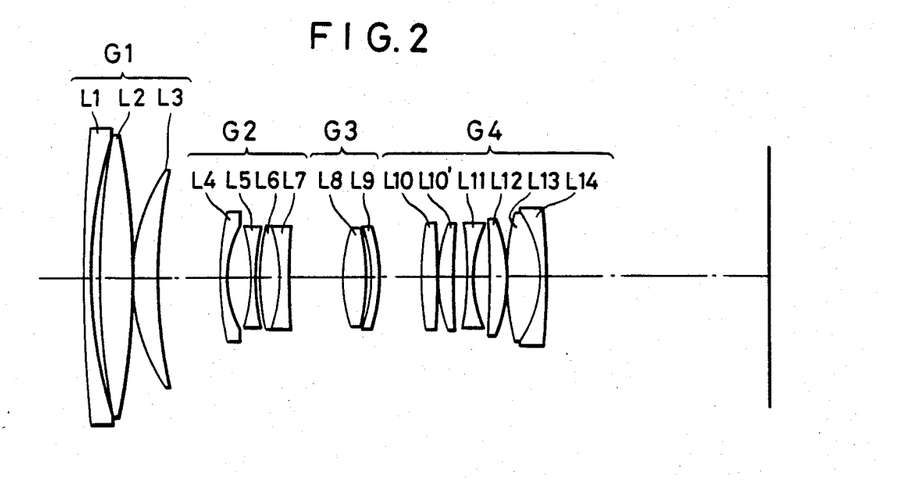
FIGS. 2 to 5 show the lens constructions of the first to fourth embodiments.
Figure 6:
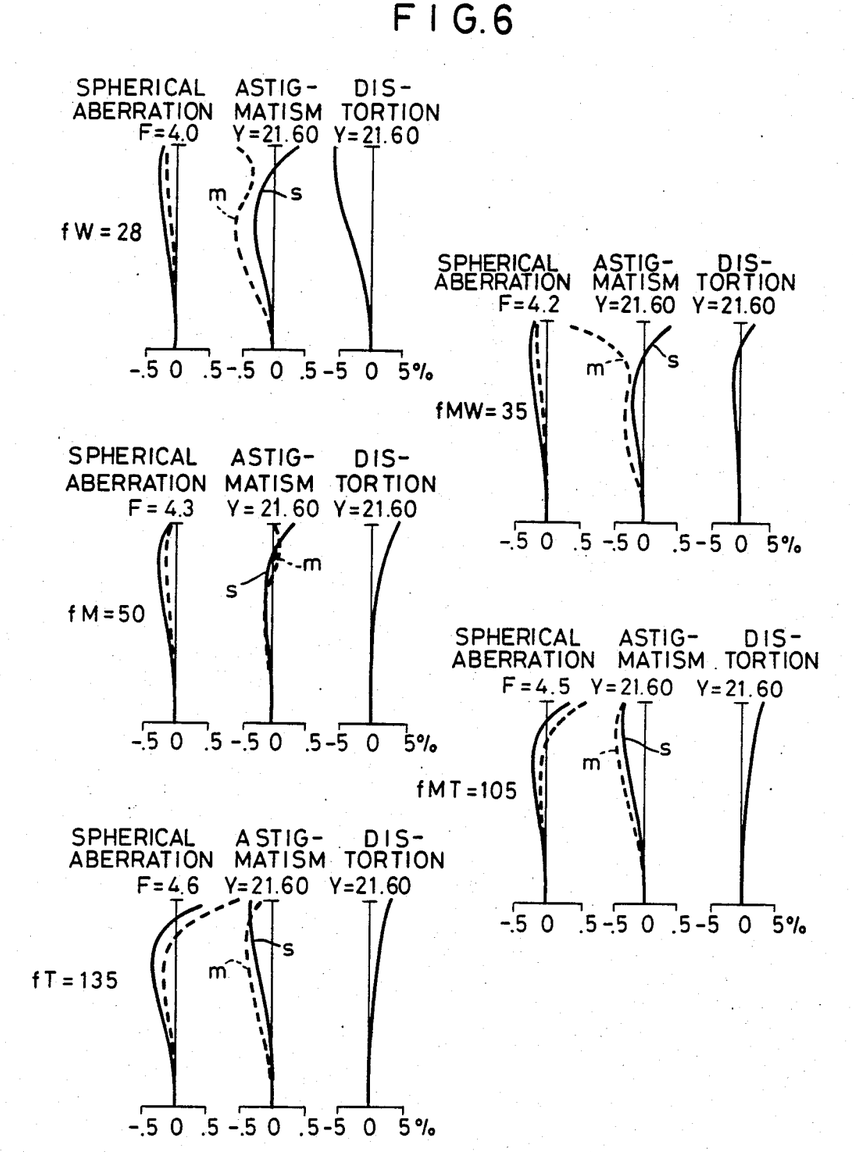
FIGS. 6 to 9 show the various aberrations in each focal length state in the respective embodiments.

In the first embodiment shown in Table 1 below, the position of the second lens group at the telephoto end is more adjacent to the object side than the position of the second lens group at the wide angle end, and the manner of movement of each group is as shown in FIG. 1A. FIG. 2 shows the lens construction of the first embodiment, and FIG. 6 shows the various aberrations in each focal length state.

Figure 1B:
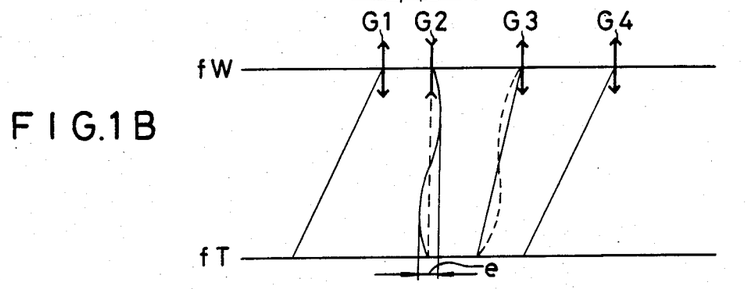
Figure 3:
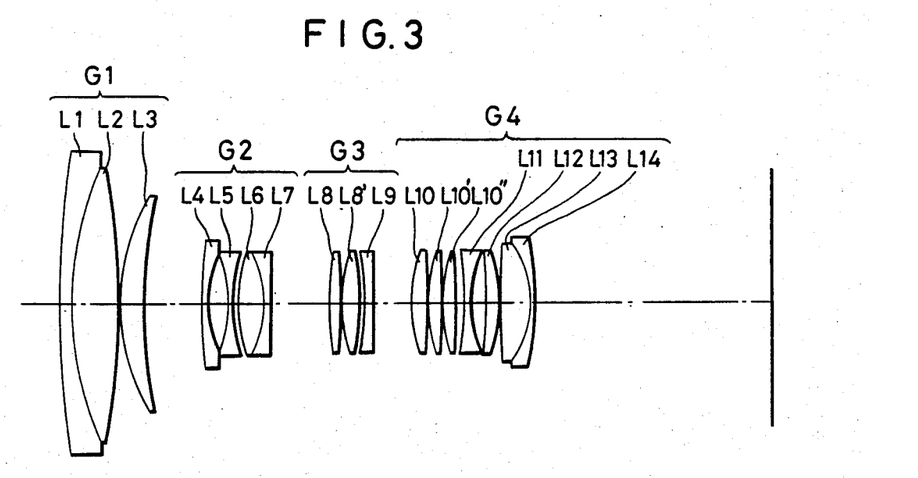
Figure 7:
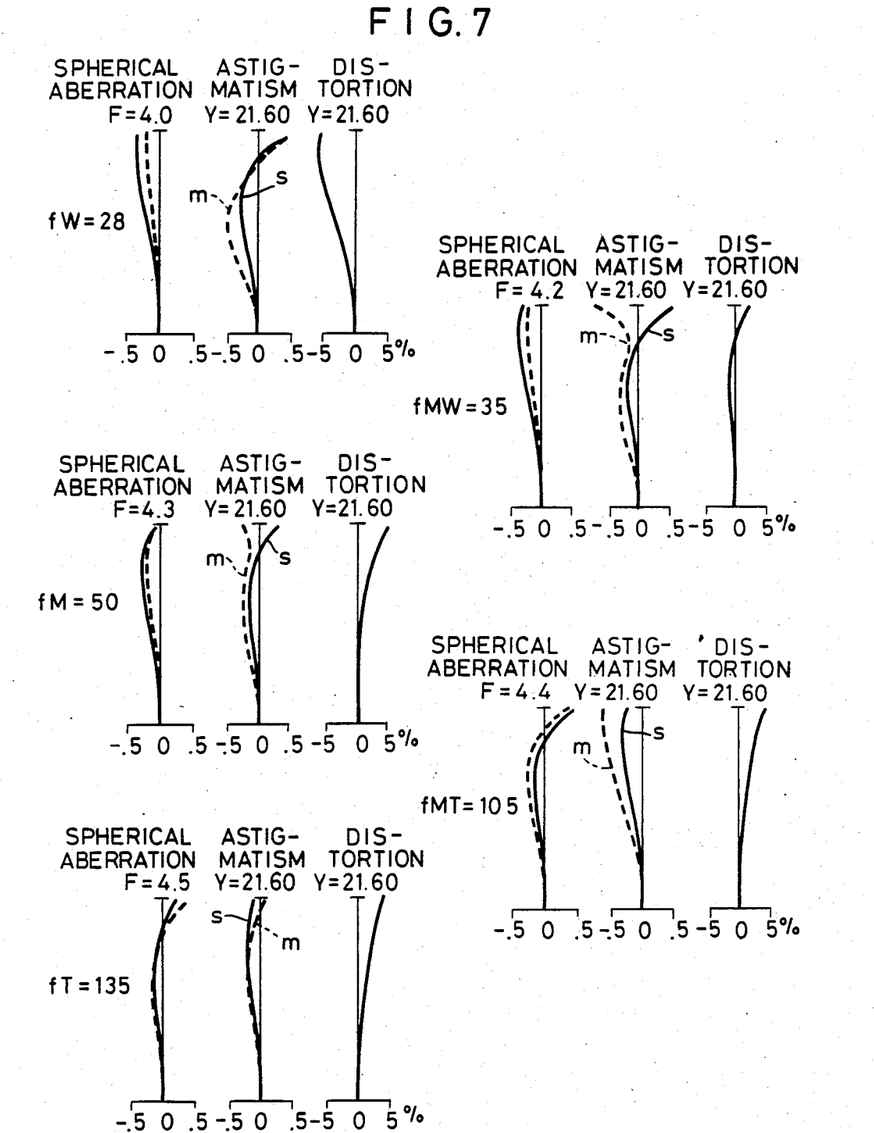

In the second embodiment shown in Table 2 below, the position of the second lens group at the telephoto end is substantially the same as the position of the second lens group at the wide angle end, and the manner of movement of each group is as shown in FIG. 1B. FIG. 3 shows the lens construction of the second embodiment, and FIG. 7 shows the various aberrations therein.

Figure 1C:
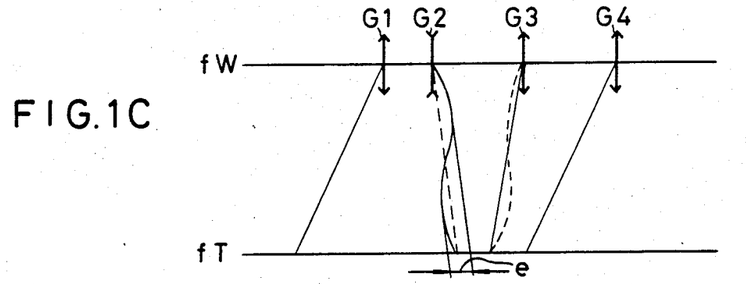
Figure 4:
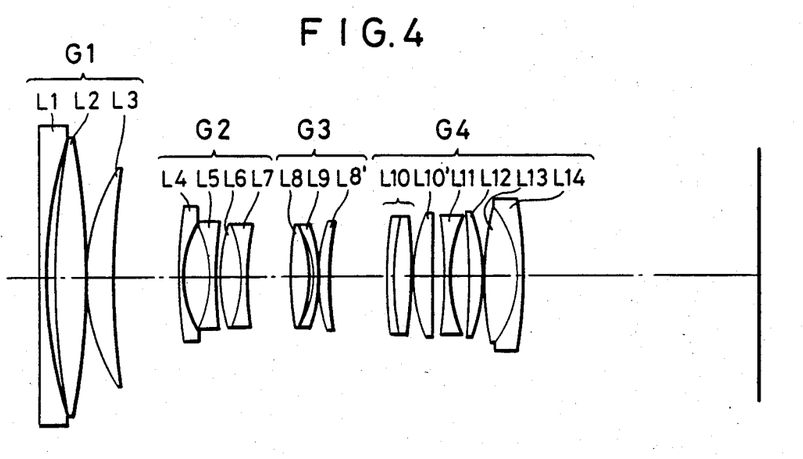
Figure 8:
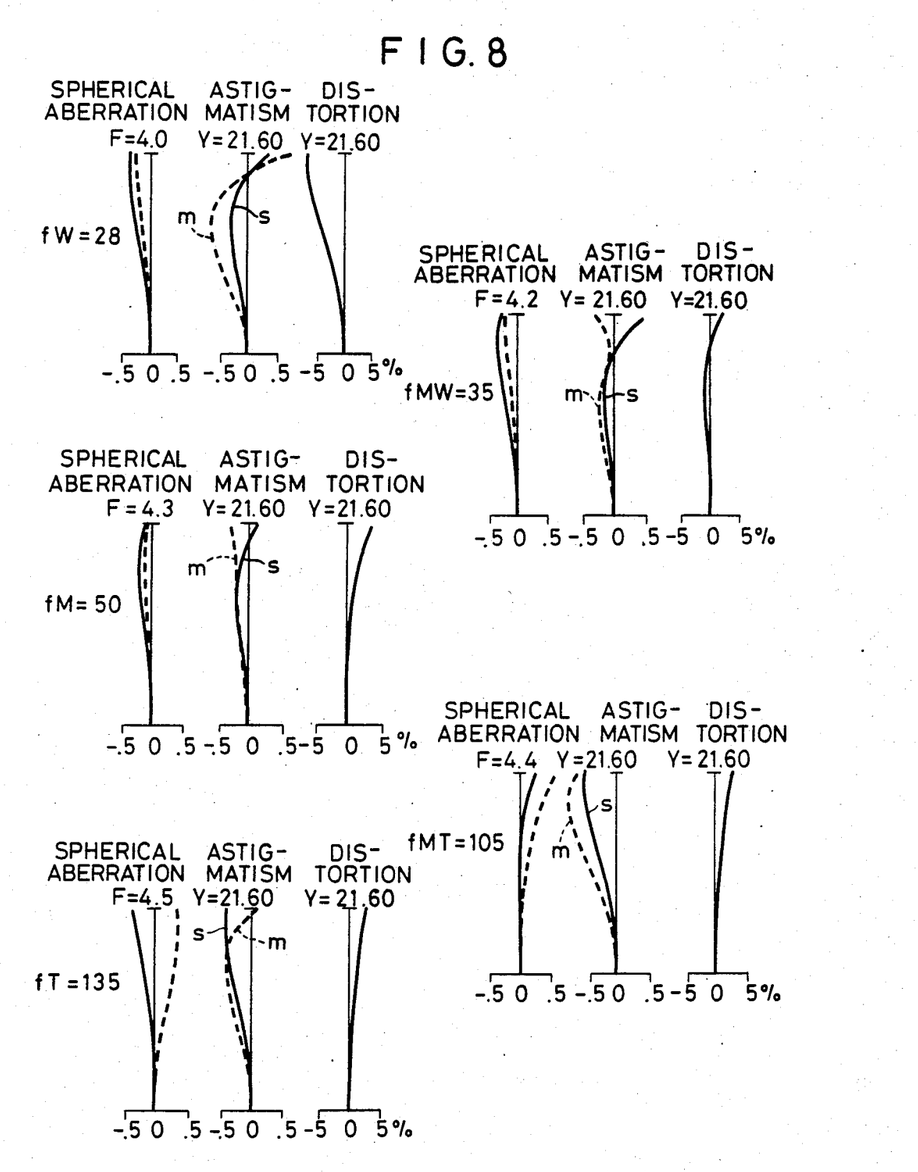

In the third embodiment shown in Table 3 below, the position of the second lens group at the telephoto end is more adjacent to the image side than the position of the second lens group at the wide angle end, and the manner of movement of each group is as shown in FIG. 1C. FIG. 4 shows a cross-sectional view of the third embodiment, and FIG. 8 shows the various aberrations therein.

Figure 1D:
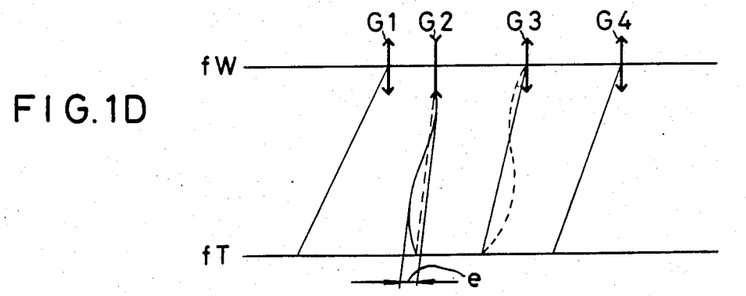
Figure 5:
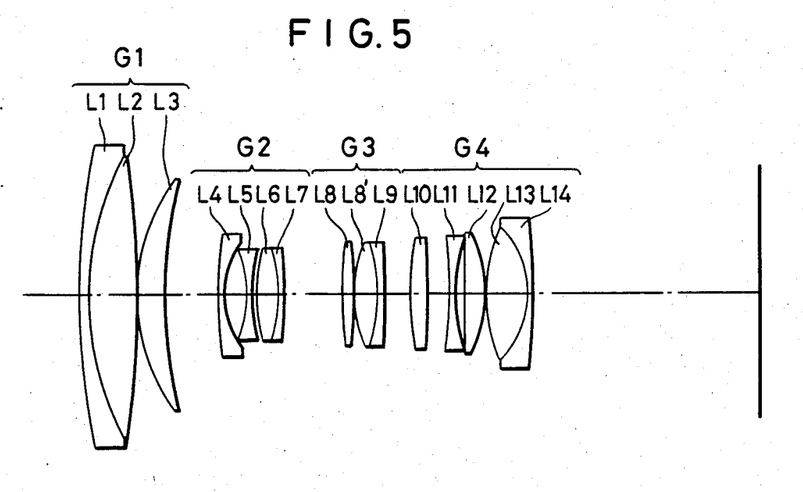
Figure 9:
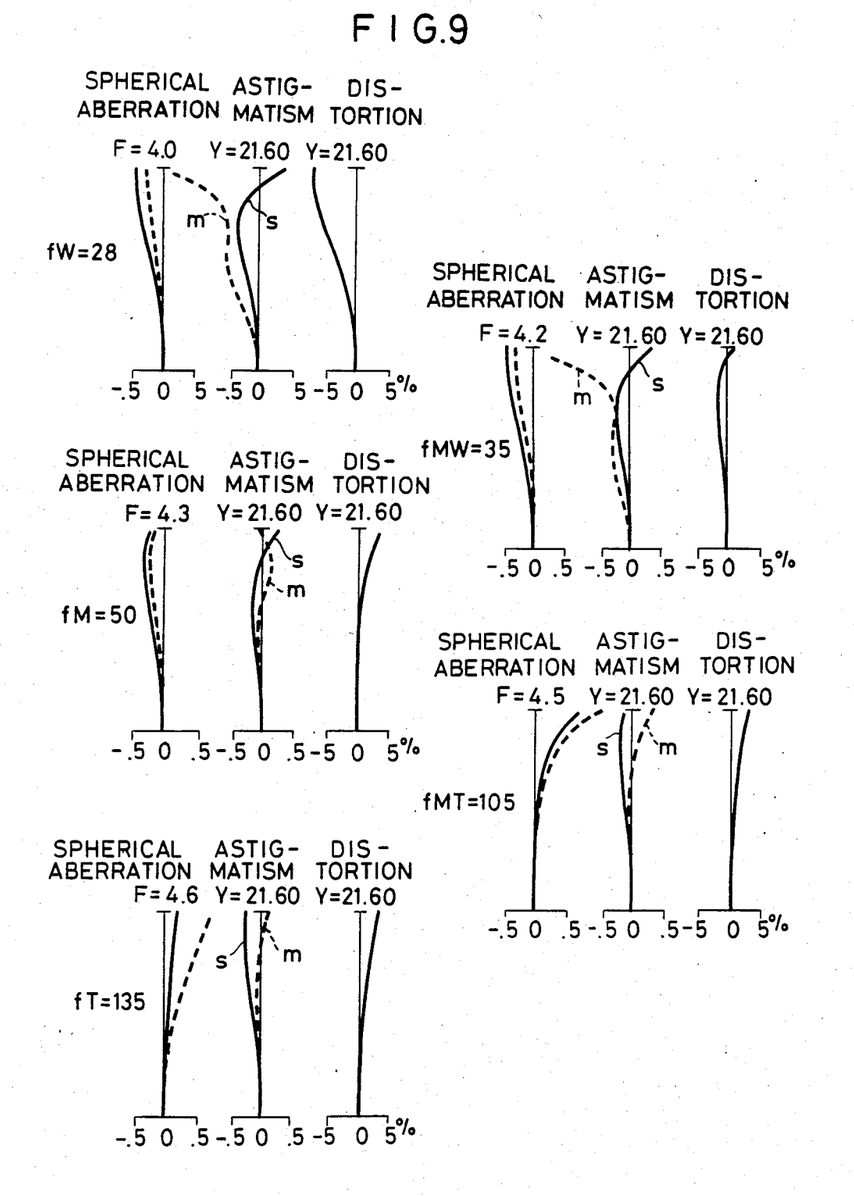

In the fourth embodiment shown in Table 4 below, as in the first embodiment, the position of the second lens group at the telephoto end is more adjacent to the object side than the position of the second lens group at the wide angle end, and the fourth lens group is moved linearly toward the object side at a rate different from that for the first lens group. The manner of movement of each group of this embodiment is shown in FIG. 1D. FIG. 5 shows the lens construction of the fourth embodiment, and FIG. 9 shows the various aberrations in each focal length.

In the tables below, the numbers at the left end represent the order from the object side.

TABLE 1
(First Embodiment)

Focal length f = 28~135    F-Number: 4.0~4.6

| No | Radius of curvature r | Center thickness and spacing d | Refractive index n | Abbe number ν | |
|---|---|---|---|---|---|
| 1 | 324.78 | 1.50 | 1.86074 | 23.00 | G1 |
| 2 | 88.38 | 2.00 | | | |
| 3 | 151.51 | 8.00 | 1.71300 | 53.97 | |
| 4 | −134.26 | 0.10 | | | |
| 5 | 41.29 | 4.80 | 1.62041 | 60.29 | |
| 6 | 94.53 | (D1) | | | |
| 7 | 65.11 | 1.00 | 1.80411 | 46.43 | G2 |
| 8 | 20.78 | 6.00 | | | |
| 9 | −34.06 | 1.00 | 1.80411 | 46.43 | |
| 10 | 50.02 | 1.00 | | | |
| 11 | 42.35 | 5.00 | 1.80518 | 25.36 | |
| 12 | −25.19 | 1.00 | 1.79668 | 45.52 | |
| 13 | 126.74 | (D2) | | | |
| 14 | 33.3 | 5.00 | 1.62041 | 60.29 | G3 |
| 15 | −31.52 | 1.00 | | | |
| 16 | −24.58 | 1.20 | 1.80518 | 25.36 | |
| 17 | −52.53 | (D3) | | | |
| 18 | 60.35 | 3.80 | 1.62041 | 60.29 | G4 |
| 19 | −152.22 | 0.10 | | | |
| 20 | 32.11 | 3.5 | 1.62041 | 60.29 | |
| 21 | 108.18 | 3.5 | | | |
| 22 | −100.29 | 1.00 | 1.7443 | 49.46 | |
| 23 | 26.85 | 4.20 | | | |
| 24 | −152.35 | 3.40 | 1.62041 | 60.29 | |
| 25 | −34.45 | 0.10 | | | |
| 26 | 60.65 | 8.00 | 1.60311 | 60.68 | |
| 27 | −21.58 | 1.00 | 1.79631 | 40.98 | |
| 28 | −209.93 | | | | |

| | fW | fMW | fM | fMT | fT |
|---|---|---|---|---|---|
| f | 28.6 | 35.0 | 50.0 | 105.0 | 131.0 |
| D1 | 0.50 | 5.82 | 14.43 | 29.95 | 34.12 |
| D2 | 21.68 | 18.11 | 12.77 | 4.03 | 1.55 |
| D3 | 14.77 | 13.01 | 9.75 | 2.96 | 1.28 |

$f_1/fM = 1.372$
$f_2/fW = 0.615$
$f_3/fM = 0.765$
$f_3/f_4 = 0.723$
$e/f_2 = 0.0853$
$V_3/V_4 = 0.613$

TABLE 2
(Second Embodiment)

Focal length f = 28~135   F-Number: 4.0~4.5

| No | Radius of curvature r | Center thickness and spacing d | Refractive index n | Abbe number ν | |
|---|---|---|---|---|---|
| 1 | 265.85 | 2.00 | 1.80518 | 25.36 | G1 |
| 2 | 63.65 | 11.00 | 1.62041 | 60.29 | |
| 3 | −167.10 | 0.10 | | | |
| 4 | 43.76 | 5.10 | 1.77279 | 49.44 | |
| 5 | 101.30 | (D1) | | | |
| 6 | 97.86 | 1.1 | 1.90265 | 35.76 | G2 |
| 7 | 19.68 | 5.00 | | | |
| 8 | −33.57 | 1.10 | 1.90265 | 35.76 | |
| 9 | 33.41 | 1.00 | | | |
| 10 | 35.47 | 5.70 | 1.86074 | 23.00 | |
| 11 | −23.03 | 1.20 | 1.77279 | 49.44 | |
| 12 | 338.93 | (D2) | | | |
| 13 | 58.63 | 2.70 | 1.51680 | 64.12 | G3 |
| 14 | −125.77 | 0.10 | | | |
| 15 | 34.79 | 3.90 | 1.49782 | 82.28 | |
| 16 | −62.21 | 1.60 | | | |
| 17 | −41.24 | 1.20 | 1.79504 | 28.57 | |
| 18 | −291.27 | (D3) | | | |
| 19 | 32.08 | 3.70 | 1.51680 | 64.12 | G4 |
| 20 | −176.48 | 0.10 | | | |
| 21 | 58.27 | 2.70 | 1.51680 | 64.12 | |
| 22 | −10751.35 | 0.10 | | | |
| 23 | 39.02 | 2.90 | 1.51680 | 64.12 | |
| 24 | 245.43 | 2.60 | | | |
| 25 | −54.42 | 1.20 | 1.79668 | 45.52 | |
| 26 | 24.02 | 3.20 | | | |
| 27 | −179.03 | 3.00 | 1.56384 | 60.82 | |
| 28 | −38.95 | 0.10 | | | |
| 29 | 123.64 | 7.20 | 1.51860 | 70.08 | |
| 30 | −20.09 | 1.40 | 1.79668 | 45.52 | |
| 31 | −44.72 | | | | |

| | fW | fMW | fM | fMT | fT |
|---|---|---|---|---|---|
| f | 28.6 | 35.0 | 50.0 | 105.0 | 131.0 |
| D1 | 0.93 | 5.57 | 13.07 | 26.44 | 29.96 |
| D2 | 20.81 | 1791 | 13.52 | 5.83 | 3.35 |
| D3 | 13.64 | 11.90 | 8.79 | 3.11 | 2.07 |

$f_1/fM = 1.144$
$f_2/fW = 0.525$
$f_3/fM = 0.817$
$f_3/f_4 = 0.842$
$e/f_2 = 0.0873$
$V_3/V_4 = 0.601$

TABLE 3
(Third Embodiments)

Focal length f = 28~135    F-Number: 4.0~4.5

| No | Radius of curvature r | Center thickness and spacing d | Refractive index n | Abbe number ν | |
|---|---|---|---|---|---|
| 1 | 600.64 | 1.50 | 1.86074 | 23.00 | G1 |
| 2 | 90.92 | 2.00 | | | |
| 3 | 150.49 | 7.00 | 1.77279 | 49.44 | |
| 4 | −150.92 | 0.10 | | | |
| 5 | 43.22 | 5.20 | 1.71300 | 53.97 | |
| 6 | 114.31 | (D1) | | | |
| 7 | 74.67 | 1.00 | 1.80411 | 46.43 | G2 |
| 8 | 17.66 | 6.00 | | | |
| 9 | −30.77 | 1.00 | 1.80411 | 46.43 | |
| 10 | 77.00 | 1.00 | | | |
| 11 | 33.84 | 5.00 | 1.80518 | 25.36 | |
| 12 | −29.81 | 1.00 | 1.80411 | 46.43 | |
| 13 | 49.37 | (D2) | | | |
| 14 | 50.41 | 4.50 | 1.51680 | 64.12 | G3 |
| 15 | −22.66 | 0.50 | | | |
| 16 | −19.65 | 1.20 | 1.80518 | 25.36 | |
| 17 | −30.15 | 0.10 | | | |
| 18 | 33.59 | 2.30 | 1.62041 | 60.29 | |
| 19 | 53.22 | (D3) | | | |
| 20 | 113.55 | 1.30 | 1.76684 | 46.76 | G4 |
| 21 | 49.56 | 4.20 | 1.51680 | 64.12 | |
| 22 | −118.75 | 0.10 | | | |
| 23 | 27.26 | 4.50 | 1.62041 | 60.29 | |
| 24 | ∞ | 3.00 | | | |
| 25 | −87.48 | 1.00 | 1.77279 | 49.44 | |
| 26 | 28.70 | 4.20 | | | |
| 27 | −183.63 | 3.40 | 1.62041 | 60.29 | |
| 28 | −35.60 | 0.10 | | | |
| 29 | 66.14 | 8.00 | 1.51680 | 64.12 | |
| 30 | −21.71 | 1.00 | 1.79631 | 40.98 | |
| 31 | −89.45 | | | | |

| | fW | fMW | fM | fMT | fT |
|---|---|---|---|---|---|
| f | 28.6 | 35.0 | 50.0 | 105.0 | 131.0 |
| D1 | 0.54 | 6.15 | 15.07 | 30.38 | 34.20 |
| D2 | 16.36 | 13.81 | 10.03 | 3.69 | 1.72 |
| D3 | 21.52 | 18.47 | 13.31 | 4.36 | 2.51 |

$f_1/fM = 1.225$
$f_2/fW = 0.489$
$f_3/fM = 0.628$
$f_3/f_4 = 0.556$
$e/f_4 = 0.0574$
$V_3/V_4 = 0.407$

TABLE 4
(Fourth Embodiment)

Focal length f = 28~135   F-Number: 4.0~4.6

TABLE 4-continued (Fourth Embodiment)

| No | Radius of curvature r | Center thickness and spacing d | Refractive index n | Abbe number ν | |
|---|---|---|---|---|---|
| 1 | 147.90 | 2.00 | 1.86074 | 23.00 | G1 |
| 2 | 59.15 | 11.00 | 1.67025 | 57.58 | |
| 3 | −231.50 | 0.10 | | | |
| 4 | 37.98 | 5.80 | 1.60311 | 60.68 | |
| 5 | 87.00 | (D1) | | | |
| 6 | 67.72 | 1.00 | 1.84042 | 43.30 | G2 |
| 7 | 15.65 | 6.00 | | | |
| 8 | −22.37 | 1.00 | 1.84042 | 43.30 | |
| 9 | 50.26 | 1.00 | | | |
| 10 | 45.15 | 5.00 | 1.86074 | 23.00 | |
| 11 | −22.30 | 1.00 | 1.80411 | 46.43 | |
| 12 | −115.09 | (D2) | | | |
| 13 | 54.28 | 3.00 | 1.51680 | 64.12 | G3 |
| 14 | −80.49 | 0.10 | | | |
| 15 | 30.95 | 5.40 | 1.51835 | 60.34 | |
| 16 | −27.32 | 1.20 | 1.79504 | 28.57 | |
| 17 | −149.84 | (D3) | | | |
| 18 | 63.81 | 4.50 | 1.51680 | 64.12 | G4 |
| 19 | −214.02 | 5.00 | | | |
| 20 | −107.54 | 1.00 | 1.79668 | 45.52 | |
| 21 | 36.93 | 2.00 | | | |
| 22 | −498.39 | 4.50 | 1.51680 | 64.12 | |
| 23 | −27.08 | 0.10 | | | |
| 24 | 32.70 | 9.50 | 1.51680 | 64.12 | |
| 25 | −20.14 | 1.00 | 1.79631 | 40.98 | |
| 26 | −211.97 | | | | |

| f | fW | fMW | fM | fMT | fT |
|---|---|---|---|---|---|
| | 28.6 | 35.0 | 50.0 | 105.0 | 131.0 |
| D1 | 0.50 | 4.80 | 12.11 | 25.25 | 28.69 |
| D2 | 20.53 | 17.63 | 12.92 | 4.13 | 1.20 |
| D3 | 8.04 | 7.11 | 5.38 | 2.48 | 2.14 |

$f_1/fM = 1.107$
$f_2/fW = 0.521$
$f_3/fM = 0.582$
$f_3/f_4 = 0.313$
$e/f_2 = 0.165$
$V3/V4 = 0.778$

The various aberrations in the above-described first to fourth embodiments are shown in FIGS. 6 to 9, respectively. In each aberration graph, the various aberrations at five positions, i.e., the wide angle end fW, the intermediate focal length fM, the telephoto end fT, the intermediate focal lengh fMW between the wide angle end and the intermediate focal length fM, and the intermediate focal length fMT between the telephoto end and the intermediate focal length fM are shown and spherical aberration, astigmatism and distortion thereat are shown. In each graph of spherical aberration, the offence of sine condition is indicated by dotted line.

According to the aberration graphs, it is apparent that in any of the above-described embodiments, a stable and excellent imaging performance is always maintained over the wide magnification change range from the wide angle to the telephoto.

According to the present invention, as described above, there is achieved a high magnification change rate zoom lens system which includes a wide angle of view exceeding 70° and has a wide magnification change range in which the zoom ratio is four times or more and yet which maintains a good optical performance over the full range from the wide angle end to the telephoto end and moreover is compact. Particularly, according to the movement locus of the second lens group as in the present invention, substantial correction of the image plane is also effected and this is very advantageous in respect of aberration correction.

I claim:

1. In a zoom lens system having, in succession from the object side, a first lens group of positive refractive power, a second lens group of negative refractive power, a third lens group of positive refractive power and a fourth lens group of positive refractive power and including a wide angle of view of 70° or more and having a wide magnification change range of a zoom ratio of four times or more, the improvement residing in that when zooming is effected from the wide angle end to the telephoto end, said first lens group and said fourth lens group are moved linearly on the optic axis toward the object side, and said second lens group is moved nonlinearly on the optic axis in response to the movement of said first and fourth lens groups to maintain the image point constant, and relative to a linear movement locus passing through the position at the wide angle end of the magnification change range and the position at the telephoto end, said second lens group has a movement locus near to the image side from the wide angle end to the vicinity of the intermediate focal length state and has a nonlinear movement locus near to the object side from the vicinity of the intermediate focal length state to the telephoto end, and wherein said zoom lens system satisfies the following conditions:

$$1.0 \leq f_a/fM \leq 1.4 \tag{1}$$

$$0.4 \leq |f_2|/fW \leq 0.7 \tag{2}$$

$$0.5 \leq f_3/fM \leq 1.0 \tag{3}$$

$$0.3 \leq f_3/f_4 \leq 1.0 \tag{4}$$

$$0.03 \leq e/|f_2| \leq 0.25 \tag{5}$$

where $f_1$, $f_2$, $f_3$ and $f_4$ are the focal lengths, respectively, of said first lens group, said second lens group, said third lens group and said fourth lens group, fW is the focal length of the entire system at the wide angle end, fT is the focal length of the entire system at the telephoto end, e is the deviation width of the nonlinear movement locus of said second lens group for magnification change from the linear movement locus thereof, and fM is defined as $fM = \sqrt{fW \cdot fT}$.

2. A zoom lens system according to claim 1, wherein said third lens group is moved toward the object side for the magnification change from the wide angle end to the telephoto end in response to the movement of said first and fourth lens groups, and the following condition is satisfied:

$$0.25 \leq V3/V4 \leq 0.85 \tag{6}$$

where V3 is the amount of movement of said third lens group and V4 is the amount of movement of said fourth lens group for magnification change.

3. A zoom lens system according to claim 2, wherein said first lens group hasa, in succession from the object side, a negative meniscus lens having its convex surface facing the object side, a biconvex positive lens and a positive meniscus lens having its convex surface facing the object side.

4. A zoom lens system acording to claim 2, wherein said second lens group has, in succession from the object side, a negative meniscus lens having its convex surface facing the object side, a biconcave negative lens, a biconvex positive lens and a negative lens having its surface of sharper curvature facing the object side.

5. A zoom lens system according to claim 2, wherein said third lens group has at least one positive lens and a negative meniscus lens having its convex surface facing the image side.

6. A zoom lens system according to claim 2, wherein said fourth lens group has, in succession from the object side at least one positive lens, a biconcave negative lens, a positive meniscus lens having its convex surface facing the image side, a positive lens and a negative meniscus lens having its concave surface facing the object side.

7. A zoom lens system according to claim 2, wherein numerical data are as follows:

| No | Radius of curvature r | Center thickness and spacing d | Refractive index n | Abbe number $\nu$ | |
|---|---|---|---|---|---|
| | Focal length f = 28~135 | | F-Number: 4.0~4.6 | | |
| 1 | 324.78 | 1.50 | 1.86074 | 23.00 | G1 |
| 2 | 88.38 | 2.00 | | | |
| 3 | 151.51 | 8.00 | 1.71300 | 53.97 | |
| 4 | −134.26 | 0.10 | | | |
| 5 | 41.29 | 4.80 | 1.62041 | 60.29 | |
| 6 | 94.53 | (D1) | | | |
| 7 | 65.11 | 1.00 | 1.80411 | 46.43 | G2 |
| 8 | 20.78 | 6.00 | | | |
| 9 | −34.06 | 1.00 | 1.80411 | 46.43 | |
| 10 | 50.02 | 1.00 | | | |
| 11 | 42.35 | 5.00 | 1.80518 | 25.36 | |
| 12 | −25.19 | 1.00 | 1.79668 | 45.52 | |
| 13 | 126.74 | (D2) | | | |
| 14 | 33.3 | 5.00 | 1.62041 | 60.29 | G3 |
| 15 | −31.52 | 1.00 | | | |
| 16 | −24.58 | 1.20 | 1.80518 | 25.36 | |
| 17 | −52.53 | (D3) | | | |
| 18 | 60.35 | 3.80 | 1.62041 | 60.29 | G4 |
| 19 | −152.22 | 0.10 | | | |
| 20 | 32.11 | 3.5 | 1.62041 | 60.29 | |
| 21 | 108.18 | 3.5 | | | |
| 22 | −100.29 | 1.00 | 1.74443 | 49.46 | |
| 23 | 26.85 | 4.20 | | | |
| 24 | −152.35 | 3.40 | 1.62041 | 60.29 | |
| 25 | −34.45 | 0.10 | | | |
| 26 | 60.65 | 8.00 | 1.60311 | 60.68 | |
| 27 | −21.58 | 1.00 | 1.79631 | 40.98 | |
| 28 | −209.93 | | | | |

| | fW | fMW | fM | fMT | fT |
|---|---|---|---|---|---|
| f | 28.6 | 35.0 | 50.0 | 105.0 | 131.0 |
| D1 | 0.50 | 5.82 | 14.43 | 29.95 | 34.12 |
| D2 | 21.68 | 18.11 | 12.77 | 4.03 | 1.55 |
| D3 | 14.77 | 13.01 | 9.75 | 2.96 | 1.28 |

$f_1/fM = 1.372$
$f_2/fW = 0.615$
$f_3/fM = 0.765$
$f_3/f_4 = 0.723$
$e/f_2 = 0.0853$
$V_3/V_4 = 0.613$

8. A zoom lens system according to claim 2, wherein numerical data are as follows:

| No | Radius of curvature r | Center thickness and spacing d | Refractive index n | Abbe number $\nu$ | |
|---|---|---|---|---|---|
| | Focal length f = 28~135 | | F-Number: 4.0~4.5 | | |
| 1 | 265.85 | 2.00 | 1.80518 | 25.36 | G1 |
| 2 | 63.65 | 11.00 | 1.62041 | 60.29 | |
| 3 | −167.10 | 0.10 | | | |
| 4 | 43.76 | 5.10 | 1.77279 | 49.44 | |
| 5 | 101.30 | (D1) | | | |
| 6 | 97.86 | 1.1 | 1.90265 | 35.76 | G2 |
| 7 | 19.68 | 5.00 | | | |
| 8 | −33.57 | 1.10 | 1.90265 | 35.76 | |
| 9 | 33.41 | 1.00 | | | |
| 10 | 35.47 | 5.70 | 1.86074 | 23.00 | |
| 11 | −23.03 | 1.20 | 1.77279 | 49.44 | |
| 12 | 338.93 | (D2) | | | |
| 13 | 58.63 | 2.70 | 1.51680 | 64.12 | G3 |
| 14 | −125.77 | 0.10 | | | |
| 15 | 34.79 | 3.90 | 1.49782 | 82.28 | |
| 16 | −62.21 | 1.60 | | | |
| 17 | −41.24 | 1.20 | 1.79504 | 28.57 | |
| 18 | −291.27 | (D3) | | | |
| 19 | 32.08 | 3.70 | 1.51680 | 64.12 | G4 |
| 20 | −176.48 | 0.10 | | | |
| 21 | 58.27 | 2.70 | 1.51680 | 64.12 | |
| 22 | −10751.35 | 0.10 | | | |
| 23 | 39.02 | 2.90 | 1.51680 | 64.12 | |
| 24 | 245.43 | 2.60 | | | |
| 25 | −54.42 | 1.20 | 1.79668 | 45.52 | |
| 26 | 24.02 | 3.20 | | | |
| 27 | −179.03 | 3.00 | 1.56384 | 60.82 | |
| 28 | −38.95 | 0.10 | | | |
| 29 | 123.64 | 7.20 | 1.51860 | 70.08 | |
| 30 | −20.09 | 1.40 | 1.79668 | 45.52 | |
| 31 | −44.72 | | | | |

| | fW | fMW | fM | fMT | fT |
|---|---|---|---|---|---|
| f | 28.6 | 35.0 | 50.0 | 105.0 | 131.0 |
| D1 | 0.93 | 5.57 | 13.07 | 26.44 | 29.96 |
| D2 | 20.81 | 1791 | 13.52 | 5.83 | 3.35 |
| D3 | 13.64 | 11.90 | 8.79 | 3.11 | 2.07 |

$f_1/fM = 1.144$
$f_2/fW = 0.525$
$f_3/fM = 0.817$
$f_3/f_4 = 0.842$
$e/f_2 = 0.0873$
$V_3/V_4 = 0.601$

9. A zoom lens system according to claim 2, wherein numerical data are as follows:

| No | Radius of curvature r | Center thickness and spacing d | Refractive index n | Abbe number $\nu$ | |
|---|---|---|---|---|---|
| | Focal length f = 28~135 | | F-Number: 4.0~4.5 | | |
| 1 | 600.64 | 1.50 | 1.86074 | 23.00 | G1 |
| 2 | 90.92 | 2.00 | | | |
| 3 | 150.49 | 7.00 | 1.77279 | 49.44 | |
| 4 | −150.92 | 0.10 | | | |
| 5 | 43.22 | 5.20 | 1.71300 | 53.97 | |
| 6 | 114.31 | (D1) | | | |
| 7 | 74.67 | 1.00 | 1.80411 | 46.43 | G2 |
| 8 | 17.66 | 6.00 | | | |
| 9 | −30.77 | 1.00 | 1.80411 | 46.43 | |
| 10 | 77.00 | 1.00 | | | |
| 11 | 33.84 | 5.00 | 1.80518 | 25.36 | |
| 12 | −29.81 | 1.00 | 1.80411 | 46.43 | |
| 13 | 49.37 | (D2) | | | |
| 14 | 50.41 | 4.50 | 1.51680 | 64.12 | G3 |
| 15 | −22.66 | 0.50 | | | |
| 16 | −19.65 | 1.20 | 1.80518 | 25.36 | |
| 17 | −30.15 | 0.10 | | | |
| 18 | 33.59 | 2.30 | 1.62041 | 60.29 | |
| 19 | 53.22 | (D3) | | | |
| 20 | 113.55 | 1.30 | 1.76684 | 46.76 | G4 |
| 21 | 49.56 | 4.20 | 1.51680 | 64.12 | |
| 22 | −118.75 | 0.10 | | | |
| 23 | 27.26 | 4.50 | 1.62041 | 60.29 | |
| 24 | ∞ | 3.00 | | | |
| 25 | −87.48 | 1.00 | 1.77279 | 49.44 | |
| 26 | 28.70 | 4.20 | | | |
| 27 | −183.63 | 3.40 | 1.62041 | 60.29 | |
| 28 | −35.60 | 0.10 | | | |
| 29 | 66.14 | 8.00 | 1.51680 | 64.12 | |
| 30 | −21.71 | 1.00 | 1.79631 | 40.98 | |
| 31 | −89.45 | | | | |

| | fW | fMW | fM | fMT | fT |
|---|---|---|---|---|---|
| f | 28.6 | 35.0 | 50.0 | 105.0 | 131.0 |
| D1 | 9.54 | 6.15 | 15.07 | 30.38 | 34.20 |
| D2 | 16.36 | 13.81 | 10.03 | 3.69 | 1.72 |
| D3 | 21.52 | 18.47 | 13.31 | 4.36 | 2.51 |

$f_1/fM = 1.225$
$f_2/fW = 0.489$

-continued $f_3/fM = 0.628$
$f_3/f_4 = 0.556$
$e/f_4 = 0.0574$
$V_3/V_4 = 0.407$ 10. A zoom lens system according to claim 2, wherein numerical data are as follows:

| | Focal length f = 28~135 | | F-Number: 4.0~4.6 | | |
|---|---|---|---|---|---|
| No | Radius of curvature r | Center thickness and spacing d | Refractive index n | Abbe number ν | |
| 1 | 147.90 | 2.00 | 1.86074 | 23.00 | G1 |
| 2 | 59.15 | 11.00 | 1.67025 | 57.58 | |
| 3 | −231.50 | 0.10 | | | |
| 4 | 37.98 | 5.80 | 1.60311 | 60.68 | |
| 5 | 87.00 | (D1) | | | |
| 6 | 67.72 | 1.00 | 1.84042 | 43.30 | G2 |
| 7 | 15.65 | 6.00 | | | |
| 8 | −22.37 | 1.00 | 1.84042 | 43.30 | |
| 9 | 50.26 | 1.00 | | | |
| 10 | 45.15 | 5.00 | 1.86074 | 23.00 | |
| 11 | −22.30 | 1.00 | 1.80411 | 46.43 | |
| 12 | −115.09 | (D2) | | | |
| 13 | 54.28 | 3.00 | 1.51680 | 64.12 | G3 |
| 14 | −80.49 | 0.10 | | | |
| 15 | 30.95 | 5.40 | 1.51835 | 60.34 | |
| 16 | −27.32 | 1.20 | 1.79504 | 28.57 | |
| 17 | −149.84 | (D3) | | | |
| 18 | 63.81 | 4.50 | 1.51680 | 64.12 | G4 |
| 19 | −214.02 | 5.00 | | | |
| 20 | −107.54 | 1.00 | 1.79668 | 45.52 | |
| 21 | 36.93 | 2.00 | | | |
| 22 | −498.39 | 4.50 | 1.51680 | 64.12 | |
| 23 | −27.08 | 0.10 | | | |
| 24 | 32.70 | 9.50 | 1.51680 | 64.12 | |
| 25 | −20.14 | 1.00 | 1.79631 | 40.98 | |
| 26 | −211.97 | | | | |

| | fW | fMW | fM | fMT | fT |
|---|---|---|---|---|---|
| f | 28.6 | 35.0 | 50.0 | 105.0 | 131.0 |
| D1 | 0.50 | 4.80 | 12.11 | 25.25 | 28.69 |
| D2 | 20.53 | 17.63 | 12.92 | 4.13 | 1.20 |
| D3 | 8.04 | 7.11 | 5.38 | 2.48 | 2.14 |

$f_1/fM = 1.107$
$f_2/fW = 0.521$
$f_3/fM = 0.582$
$f_3/f_4 = 0.313$
$e/f_2 = 0.165$
$V_3/V_4 = 0.778$

* * * * *